United States Patent [19]
Egger

[11] Patent Number: 5,375,634
[45] Date of Patent: Dec. 27, 1994

[54] VARIABLE MASS FLOW RATE FLUID DISPENSING CONTROL

[75] Inventor: Paul R. Egger, Franklin Park, Ill.

[73] Assignee: Graco Inc., Golden Valley, Minn.

[21] Appl. No.: 133,676

[22] Filed: Oct. 7, 1993

[51] Int. Cl.[5] .......................... B65B 1/30; B65B 3/26
[52] U.S. Cl. ...................................... 141/83; 141/95;
    141/100; 141/128; 177/122; 177/50
[58] Field of Search .................. 141/83, 100, 94, 128,
    141/192, 46, 104, 95, 198; 222/56, 77, 135, 334;
    177/122, 50; 137/403, 488; 417/118, 119, 120

[56] References Cited

U.S. PATENT DOCUMENTS

| | | | |
|---|---|---|---|
| 3,870,089 | 3/1975 | Laub, III | 141/94 |
| 4,089,621 | 5/1978 | Brown | 417/118 |
| 4,258,747 | 3/1981 | Trobaugh | 137/403 |
| 4,272,824 | 6/1981 | Lewinger et al. | 364/502 |
| 4,350,186 | 9/1982 | Schalkowsky et al. | 141/83 |
| 4,775,949 | 10/1988 | Kalata | 364/567 |
| 4,872,763 | 10/1989 | Higuchi et al. | 366/160 |
| 4,921,132 | 5/1990 | Wales et al. | 141/83 |
| 5,129,418 | 7/1992 | Shimomura et al. | 137/486 |
| 5,148,841 | 9/1992 | Graffin | 141/83 |
| 5,152,354 | 10/1992 | Hauptkorn | 177/50 |
| 5,193,594 | 3/1993 | Johansson | 141/83 |

*Primary Examiner*—Henry J. Recla
*Assistant Examiner*—Steven O. Douglas
*Attorney, Agent, or Firm*—Palmatier, Sjoquist & Helget

[57] ABSTRACT

A liquid dispensing and control system having dispensing nozzles positioned for dispensing into a receptacle on a weight-sensing device, where all dispensing nozzles are respectively coupled to liquid pumps for delivering liquids from different containers to the nozzles, and a control computer connected to the weight-sensing device and to the pumps and dispensing nozzles to control the flow rate and delivery of liquids.

9 Claims, 2 Drawing Sheets

VARIABLE MASS FLOW RATE FLUID DISPENSING CONTROL

BACKGROUND OF THE INVENTION

This invention relates to an apparatus for controlling the rate of dispensing liquids; more particularly, the invention relates to an apparatus for maximizing the dispensing rate of liquids, and controllably reducing the flow rate to zero as a predetermined mass of liquid has been dispensed. The invention is particularly applicable to systems wherein bulk quantities of liquid are formed by mixing predetermined liquids together into a single container, as for example by preparing five-gallon containers with paint having predetermined color characteristics. In such systems it is expedient to partially fill a single container with predetermined quantities of base paint material, and various colorant additives, so as to achieve the proper bulk quantity of paint having the right color combination. If the quantity of a particular liquid component to be added is significant, it is desirable to dispense the quantity at a relatively high rate of flow, and when the dispensed quantity begins to reach the desired amount, to reduce the flow rate toward zero. If a number of different color combinations are to be dispensed into the same container, the container is sequentially filled from the several dispensing nozzles until the container becomes filled with the requisite quantity of each colorant.

If the receiving container is of a known size; i.e., five gallons, one gallon, etc., the amount of colorant and base material required for a complete filling of the container may be precalculated, and various dispensing devices may be arranged to provide from each dispenser the requisite volume of liquid for completely filling the container with the proper ratio of components.

SUMMARY OF THE INVENTION

The invention includes a plurality of liquid pumps and reservoirs, each associated with a different liquid or liquid component, a plurality of dispensing nozzles coupled to the pumps, and a load cell positioned at a dispensing station for measuring the mass of the liquid dispensed. A control computer is arranged to receive signals from the load cell, and to control a pressure regulator for regulating the amount of pressurized air utilized to operate the pumps and dispensing valves, and to control the plurality of pumps and dispensing valves so as to turn on the valves and pumps in a proper and timed sequence, and to shut off the pumps and dispensing valves in accordance with signals received from the load cell.

It is a principal advantage and object of the present invention to provide a variable mass flow rate dispensing control for maximizing the flow rate through a dispenser and controllably reducing the flow rate as a predetermined liquid mass is dispensed. This object and advantage, and other objects and advantages, will become apparent from the following specification and claims, and with reference to the drawings.

DESCRIPTION OF THE PREFERRED EMBODIMENT

Figure 1:
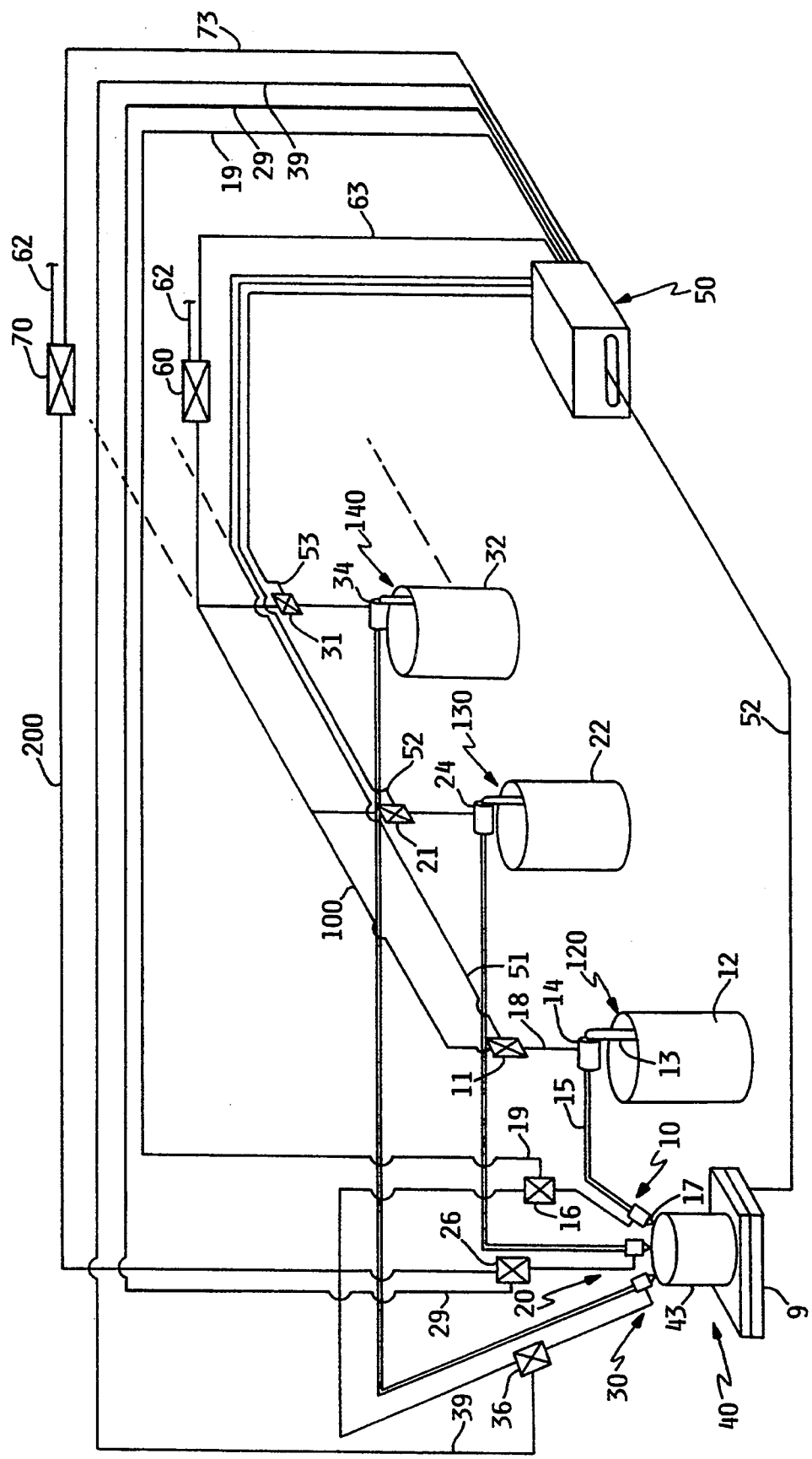
FIG. 1 shows a symbolic view of the system of the present invention.

Referring to FIG. 1, the system is shown in isometric and symbolic view. A plurality of dispensing heads 10, 20, 30, . . . are arranged in a clustered order for achieving the objectives of the present invention. A plurality of dispensing sources 120, 130, 140, . . . are arranged in a regular order. Each dispensing source includes a bulk liquid container 12, 22, 32, . . . , a liquid pump 14, 24, 34, . . . , and a solenoid valve 11, 21, 31, . . . A dispensing station 40 includes a receptacle 43 and weighing device 9, and the plurality of dispensing heads. The load cell weighing device 9 is connected electrically into a control computer 50, and the control computer 50 is electrically connected to the plurality of solenoid valves. The solenoid valves are each coupled to pressurized air lines, and the air lines are commonly connected to analog control valves or air-pressure regulators which are themselves controlled by control computer 50. The air-pressure regulators are connected to an unregulated or high-pressure air line 62 which is typically provided in industrial locations for the supply of pressurized air.

The dispensing sources 120, 130, 140 include essentially identical components, and therefore an explanation of one of the dispensing sources is sufficient to describe all of them. Referring to the dispensing source 120, a bulk container 12 holds a considerable volume of liquid for dispensing purposes. Bulk container 12 may be a 50 gallon drum, or larger container, as circumstances require. An air-operated pump 14 is coupled into the container 12 via a suction pipe 13, and has a discharge hose 15 connected to dispensing head 10. Air-operated pump 14 is controlled by pressurized air on line 18, which is connected to a solenoid valve 11. Solenoid valve 11 is controllable by electric signals on line 51, transmitted from control computer 50. A second pressurized air line coupled to solenoid valve 11 is air line 100, which is connected to air-pressure regulator 60. Air-pressure regulator 60 is controllable by control computer 50 via electrical signals sent on line 63.

The air-operated pump 14, and all similar pumps, may preferably be a Model 307 or Model 715 double-diaphragm pump, manufactured by the assignee of the present invention. The Model 307 is capable of delivering seven gallons of liquid per minute and the Model 715 is capable of delivering 15 gallons of liquid per minute. The solenoid valve 11, and all similar solenoid valves, may be selected from a number of valves manufactured by Honeywell, which are electrically operated on/off valves for the control of pressurized air.

Dispensing station 40 includes a load cell 9, which is preferably a load cell manufactured by the Toledo Scale Corp., Model KA32S, which is capable of measuring a mass of up to 0.32 kilograms (plus or minus 0.1 gram). The dispensing heads 10, 20, 30, . . . are preferably Type 205612 dispensing nozzles, manufactured by the assignee of the present invention. The control computer 50 may be a general purpose digital computer, as for example a computer utilizing the 16-bit Intel micro chip Type 80C186; other and equivalent types of processors are equally useful in the present invention, and may be suitably programmed to accomplish the purposes described herein. Air-pressure regulator 60 and air-pressure regulator 70 are a typical voltage/pressure air regulators available from a number of sources.

One example of such an air-pressure regulator is Graco Model No. 514079, manufactured by Proportion Air Company. This regulator incorporates an analog control valve which permits variable control over air pressure as a function of a variable input voltage.

Each dispensing head incorporates a dispensing valve and ejection orifice. For example, dispensing head 10 incorporates a dispensing valve 16 and dispensing orifice 17. Liquid is delivered from air-operated pump 14 via discharge hose 15 to dispensing head 10, and is ejected via orifice 17 whenever dispensing valve 16 is activated. Dispensing valve 16 becomes activated by a control signal on line 19, which is connected to control computer 50. A control signal on line 19 permits dispensing valve 16 to open, thereby passing pressurized air from air line 200 to pass to spray orifice 17, opening the orifice to permit the passage of liquid therethrough. All other dispensing heads have similar arrangements, wherein liquid is dispensed via a dispensing orifice under control of a dispensing valve. All of the dispensing valves 16, 26, 36, ..., are separately activated by control lines to control computer 50; i.e., control line 19, 29, 39, ...

Control computer 50 is a general purpose computer processor which may be programmed according to techniques which are well known in the art, to accomplish the control operations which are described herein. Control computer 50 is connected to weighing device 9 via electrical line 52. The signals on line 52 are representative of the weight which may be placed on weighing device 9, and these signals are received and stored within control computer 50. Control computer 50 is also electrically connected to each of the solenoid valves 11, 21, 31, ..., and control computer 50 generates electrical on/off signals for activation or deactivation of each of these solenoid valves. Control computer 50 is also connected to dispensing valves 16, 26, 36, ..., and generates the on/off signals for activating and deactivating the dispensing valves. Control computer 50 is also electrically connected to air-pressure regulator 60 via line 63, to provide a voltage signal representative of the degree of air pressure regulation desired from pressure regulator 60. Control computer 50 is also electrically connected to air-pressure regulator 70, to provide a voltage which is representative of the degree of pressure regulation desired from air-pressure regulator 70. The signals on line 63 and 73 are variable voltage signals which are controllable to provide variable pressure regulation to the respective air-pressure regulators 60 and 70.

The pressure-regulated air which is output from air-pressure regulator 60 is commonly coupled to solenoid valves 11, 21, 31, ..., and this pressure-regulated air is provided to the respective pumps 14, 24, 34, ..., upon activation of the corresponding solenoid valve 11, 21, 31, ... Therefore, control computer 50 not only controls the pressure of the air delivered to any of the air-operated pumps, but also controls the selective activation of the pump via the activation of the corresponding solenoid valve.

Control computer 50 also provides a variable voltage signal to air-pressure regulator 70, which results in a variably-controlled pressure from air-pressure regulator 70 via air line 200. Air line 200 is commonly connected to dispensing valve 16, 26, 36, ... and therefore the pressurized air from line 200 may be passed to any of the dispensing heads 10, 20, 30, ... when the corresponding dispensing valve 16, 26, 36, ... has been activated. The activation signals for the respective dispensing valves are on/off signals derived from control computer 50 via lines 19, 29, 39, ... Therefore, control computer 50 controls the magnitude of the pressurized air delivered to each of the dispensing heads, and also controls the activation of a particular dispensing head designated to receive the pressurized air. The magnitude of this pressurized air is used to control the orifice within the dispensing head, and thereby to control the flow rate of liquid emitted from the orifice.

The flow rate of liquid emitted from any of the orifices in dispensing heads 10, 20, 30, ... is thereby influenced by two variable pressure settings; the variable pressure applied to drive the respective air-operated pumps, and the variable pressure which is admitted to the dispensing head orifice for controlling the orifice flow rate. Both of these air-pressure variations control the relative flow rate of liquid emitted from any particular orifice, although the pumping pressure provides a wider control of flow rate and the orifice pressure provides a narrower control of flow rate. If a rapid increase in flow rate is desired, control computer 50 may rapidly increase the pressure delivered to the air-operated pump, and this will result in an immediate increase in the flow rate of liquid delivered; if a relatively small increase in flow rate is desired control computer 50 may provide an adjustment of the air pressure via air-pressure regulator 70 to the dispensing valve, to thereby increase the flow rate over a relatively narrower range of flow. Both of these controls are utilized in the operation of the invention to achieve both a "coarse" and a "fine" degree of control over flow rate.

Figure 2:
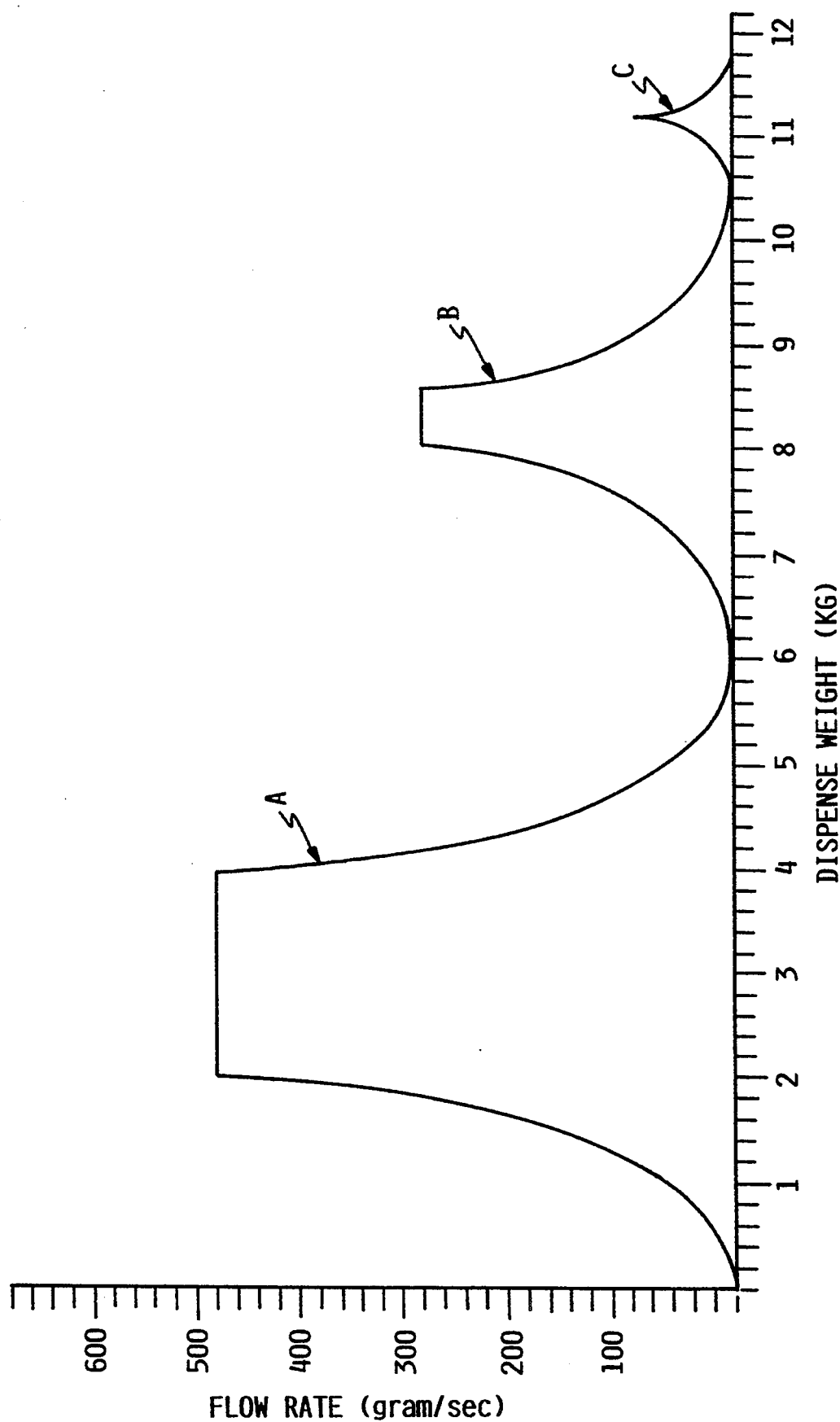
FIG. 2 shows a representative mass flow rate dispensing curve for implementation by the control computer.

FIG. 2 shows a representative graph of flow rates wherein three liquid components A, B, and C may be sequentially dispensed through the respective dispensing heads to achieve a predetermined total liquid weight into receptacle 43, wherein the respective weights of components A, B, and C are properly proportioned. The vertical scale on FIG. 2 is representative of instantaneous flow rate, and the horizontal axis on FIG. 2 is representative of dispense weight; i.e., the total weight received by receptacle 43. For purposes of illustration, FIG. 2 represents a desired total weight of approximately 12 kilograms, wherein receptacle 43 is to be filled with the three components A, B, and C according to the predetermined ratios wherein component A will weigh 6 kilograms in the filled receptacle, component B will weigh 4.5 kilograms in the filled receptacle, and component C will weigh approximately 1.5 kilograms in the filled receptacle. In operation, control computer 50 receives signals from an external source such as a keyboard (not shown) indicative of the type of liquid mixture which is to be dispensed, and the total weight or volume of that mixture which is to be dispensed. The software which has been prestored within the computer will convert this liquid mixture information into control signals for driving the respective air-pressure regulators 60, 70, and for turning on the respective solenoid and dispensing valves in the proper sequence. The operation of the system will be described with reference to the representative example of FIG. 2, and with reference to the diagram of FIG. 1. FIG. 2 illustrates the maximum possible flow rate which is deliverable by any of the pumps which is approximately 500 grams per second. All of the sequential operations and control signals are developed as a function of the signals derived from weighing device 9 via line 52, for it is the accumulated weight of the receptacle and its contents which cause the control computer 50 to generate new and revised control signals for the subsequent operation of filling the receptacle.

The first phase of control is continued until the receptacle and its contents weigh 4 kilograms. During this first phase of control, the computer 50 has determined that 6 kilograms of component A are to be filled into the receptacle 43, and therefore control computer 50 initially generates signals to fully open air-pressure regulator 60 and 70, and to activate the solenoid valve and dispensing valve associated with component A. As a result, component A is delivered into the receptacle 43 at the maximum possible flow rate for so long as it takes to accumulate 4 kilograms of liquid in receptacle 43. As soon as control computer 50 determines that 4 kilograms of weight have been accumulated it immediately begins decreasing the air pressure delivered to the component A pump, resulting in the initial steep decline of flow rate of component A. As the component A flow rate decreases and begins to approach a low value; i.e., below about 100 grams per second, control computer 50 decreases the air pressure to the component A dispensing valve to begin closing the delivery orifice in the respective dispensing head. This delivery orifice is gradually closed until the signal on line 52 from weighing device 9 indicates that 6 kilograms have been delivered, whereupon the solenoid valve and dispensing valve associated with component A are completely shut off. At this time, the solenoid valve and dispensing valve associated with component B are turned on, to deliver a full flow rate of component B until 8 kilograms of liquid have been accumulated in the dispenser 43. When 8 kilograms have been accumulated, the pressure to the component B pump is scaled back to maintain a relatively constant flow rate until about 8.6 kilograms have been accumulated in receptacle 43. At this point, the pressure regulators 60, 70 are gradually decreased to cause the relatively steep decline of delivery rate of component B until the accumulated weight reaches 10.5 kilograms, whereupon the component B solenoid valve and dispensing valve are shut off. At the same time, the solenoid valve and dispensing valve for component C are turned on, but the pressure regulators 60, 70 are kept at a low pressure rating to permit a very gradual increase in flow rate of component C. When the flow rate of component C reaches approximately 80 grams per second the air-pressure regulators 60, 70 are gradually decreased until the accumulated weight in receptacle 43 approaches 12 kilograms. At the designated 12 kilogram weight both the solenoid valve and dispensing valve associated with component C are shut off, and the receptacle 43 has received a total of 12 kilograms of a mixture including the three components A, B, and C in the proper proportions as dictated by the input signals received by control computer 50.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus including a source of pressurized air, for filling a receptacle with predefined quantities of liquid from a plurality of liquid sources by cumulatively monitoring receptacle and liquid weight, comprising:
   a) an air-operated pump coupled to each of said plurality of liquid sources, wherein the liquid flow rate delivered by each of said pumps is controlled by the pressurized air operatively connected to said pumps from said source of pressurized air;
   b) an air valve fluidically connected to each of said pumps, for controlling said pressurized air operatively connected to said pumps;
   c) a liquid delivery nozzle coupled to each of said pumps, each of said nozzles having a dispensing valve for controlling the liquid flow rate therethrough by air pressure from said source of pressurized air applied to said nozzle;
   d) means, connected to each of said nozzles, for controlling said pressurized air to said nozzles;
   e) a weight sensor having means for holding said receptacle in position to receive liquid from all of said nozzles, said weight sensor having electrical means for transmitting a signal representative of the weight of liquid in said receptacle; and
   f) a control computer electrically connected to receive said signals from said weight sensor, and having means for controlling each of said air valves and means for controlling each of said dispensing valves.

2. The apparatus of claim 1, further comprising said source of pressurized air fluidically connected to all of said air valves.

3. The apparatus of claim 2, further comprising a second source of pressurized air fluidically connected to all of said dispensing valves.

4. The apparatus of claim 2, wherein said means for controlling each of said air valves further comprises an electrically-operated solenoid valve connected to each of said pumps, all of said solenoid valves being commonly connected to said source of pressurized air.

5. The apparatus of claim 3, wherein said means for controlling each of said dispensing valves further comprises an electrically-adjustable valve connected to each of said nozzles, all of said valves being commonly connected to said second source of pressurized air.

6. The apparatus of claim 4, further comprising an electrically adjustable air regulator having means for receiving pressurized air from said source of pressurized air and having electrical control means connected to said control computer, for selectively adjusting said pressurized air.

7. The apparatus of claim 5, further comprising an electrically adjustable air regulator having means for receiving pressurized air from said second source of pressurized air and having electrical control means connected to said control computer, for selectively adjusting said pressurized air.

8. The apparatus of claim 6, further comprising a pressurized air reservoir connected to said means for receiving pressurized air.

9. The apparatus of claim 7, further comprising a pressurized air reservoir connected to said means for receiving pressurized air.

* * * * *